United States Patent [19]

Crawford et al.

[11] 4,095,994

[45] Jun. 20, 1978

[54] SOFT-SETTLING FLUOSILICATE-TREATED SILICA FLATTING AGENT

[75] Inventors: Roger A. Crawford, Wadsworth; Laurence E. Jones, Barberton, both of Ohio

[73] Assignee: PPG Industries, Inc., Pittsburgh, Pa.

[21] Appl. No.: 757,721

[22] Filed: Jan. 7, 1977

[51] Int. Cl.$^2$ ............................................. C09C 1/30
[52] U.S. Cl. ........................... 106/308 B; 106/288 B; 106/306
[58] Field of Search ................ 106/287 S, 288 B, 306, 106/292, 308 B

[56] References Cited

U.S. PATENT DOCUMENTS 2,625,492   1/1953   Young ............................... 106/308 B

*Primary Examiner*—Winston A. Douglas
*Assistant Examiner*—J. V. Howard
*Attorney, Agent, or Firm*—Robert J. Grassi

[57] ABSTRACT

Finely divided, fluosilicate-treated silica, such as silica flatting agent for use in coating formulations, is prepared by blending in a dry, finely divided state, silica and divalent metal fluosilicate, notably magnesium fluosilicate. In a preferred embodiment, dry pellets of amorphous, precipitated silica and dry magnesium fluosilicate are milled together to produce the fluosilicate-treated flatting agent. In another embodiment, an aqueous solution of magnesium fluosilicate is applied to silica pellets which are then milled.

37 Claims, No Drawings

SOFT-SETTLING FLUOSILICATE-TREATED SILICA FLATTING AGENT

BACKGROUND OF THE INVENTION

Finely divided silica, such as silica hydrogel or amorphous, precipitated silica, is used as a flatting agent to lower the gloss of coating formulations such as lacquers. However, the silica flatting agent tends to settle out of certain formulations upon standing. When a can of certain nitrocellulose lacquers, for example, is stored, a heavy, semi-solid or hard material collects in the bottom of the can. Before the lacquer can be used, the settled material must be dispersed through the lacquer. At times, the settled material cannot be adequately dispersed even with vigorous stirring.

U.S. Pat. No. 2,625,492 discloses that silica hydrogel flatting agents treated with an inorganic, fluorine containing compound, notably magnesium silicofluoride (also called magnesium fluosilicate), settle in softer, more easily dispersible layers than untreated flatting agent. In the described process, a hydrogel is formed by rapid acidification of an aqueous solution of sodium silicate. The gel is then broken up, treated with aqueous ammonia, and an aqueous solution of magnesium fluosilicate is circulated through the gel fragments until they attain a desired fluorine content. The treated gel is then dried, activated by heating, and ground to the desired particle size for use as flatting agent. The patent states broadly that the silica may be treated with any fluorine-containing compound at other stages of the operation, but only treatment in aqueous medium is described.

SUMMARY OF THE INVENTION

It has now been found that fluosilicate-treated silica, which in the proper particle sizes is useful as a soft-settling flatting agent for use in coating formulations, can be prepared by intimately blending in a dry, finely divided state silica and preferably a divalent metal fluosilicate to produce a dry, fluosilicate-treated silica which is then aged for a time sufficient to enable the metal fluosilicate and the silica to interact. By "dry" it is meant that the silica is dry to the touch during and after blending; thus, the presence of any substantial amount of free or phase water is excluded, but the presence of water of crystallization of the fluosilicate and of bound water and up to about 50 weight percent adsorbed water on the silica is contemplated.

In an embodiment of this invention, pellets of amorphous, precipitated silica and preferably a divalent metal fluosilicate powder are milled and blended at the same time to produce the treated silica. In another embodiment, pellets of amorphous, precipitated silica are milled and blended preferably with a divalent metal fluosilicate which is added as a concentrated aqueous solution or slurry. The water added in the form of solution or slurry is such a small proportion of the resulting composition that it is quickly partly adsorbed on the silica and partly evaporated in the mill, and the treated silica remains dry as that term has herein been defined, i.e., dry to the touch.

DETAILED DESCRIPTION OF THE INVENTION

Any type of silica which is known in the art for use as flatting agent in coating formulations can be treated in accordance with this invention to obtain a soft settling flatting agent. Commercially produced silicas that can be treated in accordance with this invention include pyrogenic silicas, arc silicas, aerogels, hydrogels, and precipitated silicas, but preferably the preferred silicas are hydrogels and precipitated silicas. Each of these silicas differs in agglomerate structure, agglomerate particle shape, and agglomerate particle size distribution and as a result provides different performance characteristics in coating applications.

In a discussion of silica, various types of particles may be mentioned. An ultimate particle of silica is one which cannot be reduced in size except by breaking chemical bonds. When ultimate particles adhere tightly to one another, they form an aggregate, which can be broken apart only by the application of considerable force. A loose grouping of several ultimate particles or small aggregates is an agglomerate, which has a considerable amount of air space in its structure. The agglomerate can be broken apart by the application of moderate force.

Precipitated silicas are particularly advantageous as flatting agents because of the nature of the agglomerate formed by the manufacturing process. The agglomerate is typically composed of ultimate silica particles having a particle size of about 0.02 microns, which are usually strongly associated together in small aggregates, which in turn are spaced apart in an open agglomerate structure comparable to a loose bunch of grapes.

Amorphous, synthetic precipitated silicas are produced commercially by the gradual acidification of aqueous alkali metal silicate, usually sodium silicate. Methods for the production of precipitated silica are well known. See, for example, U.S. Pat. Nos. 2,940,830 and 2,924,510. Typically, an aqueous solution of sodium silicate is slowly acidified with carbon dioxide, an acid salt thereof such as sodium hydrogen carbonate, or mineral acids.

After the precipitation step, the reaction medium containing the precipitated silica is washed and allowed to settle or thicken and the thickened slurry is filtered to produce a filter cake. The filter cake is washed and then dried in, for example, a conventional rotary dryer. Dryer product is crushed, if necessary to break up large lumps, and then milled to the agglomerate sizes needed for the intended use. The dryer product may be fed to a mill or screened to obtain a pellet fraction, for example, between −4 or −8 and +28 Tyler mesh (⅛ inch or ¼ inch to 1/64 inch), if desired for feeding to a particular mill. These pellets are then milled in conventional mills to produce a product having the greater weight of its agglomerates in the range of between about 1 and 30 microns, with a substantial proportion in the 2 to 20 micron range. Such mills are known, and include mechanical mills such as roller mills and vertical hammer mills, and fluid energy mills. The mechanical mills may be used effectively to produce agglomerates having a median size of 5 to 10 microns, which are useful particularly in coil coatings, appliance finishes, and vinyl fabric topcoats. Agglomerates having a median size in the range of 2 to 7 microns, e.g., about 4 microns, may be produced conveniently in a fluid energy mill, or by size classification of mechanically milled material, e.g., with the use of an air classifier.

The silica flatting agents useful in the present invention are at least about 90 weight percent, e.g., 94 to 97 weight percent, $SiO_2$ on an anhydrous basis, but depending upon the method of preparation, minor proportions of contaminants, e.g., metal oxides, carbonates, halides, etc., may also be present. For example, an amorphous, hydrated, precipitated silica useful in the practice of this invention may be about 94 weight percent $SiO_2$, 1 to 2 percent NaCl or $Na_2SO_4$, 0.5 to 1 percent CaO, and 0.4 to 0.8 percent trace metals (expressed as oxides) such as aluminum, chromium, zirconium, barium, and iron. Further, the useful silicas contain bound water, and adsorbed water in varying amounts depending partly upon the prevailing relative humidity. Thus, the adsorbed water content may be 1, 5, 10, even 25 percent or more by weight of hydrated silica. In fact, finely divided silica having an adsorbed water content of up to 60 percent remains a pourable powder that is only slightly damp to the touch.

Thus, useful silicas may contain at least a minor proportion, e.g., at least 1 percent by weight, of adsorbed water, for example, between about 5 and 25 weight percent. The adsorbed water content of silica is that which is removed from the silica by heating at 105° C. for 24 hours at atmospheric pressure in a laboratory oven. Bound water is that removed by heating at calcining temperatures, e.g., 1000°–1200° C.

Amorphous, hydrated precipitated silica flatting agents prepared in accordance with this invention have an ultimate particle size of between about 0.01 and 0.05 microns, typically about 0.02 microns, agglomerates distributed over broad range of sizes, e.g., from below 1 to about 40 microns with a substantial proportion in the 2 to 20 micron range, a weight median agglomerate size of between about 2 and 12 microns, and a B.E.T. surface area of 100 to 300, typically about 150, square meters per gram. The surface area is measured with the use of nitrogen gas by the method of Brunauer, Emmett, and Teller, Journal of American Chemical Society, 60, 309 (1938).

The agglomerate size distributions of hydrated, precipitated silica disclosed herein are determined in accordance with a Coulter Counter Test Method in which a Coulter Counter, Model B (Coulter Electronics, Inc., Chicago, IL) is used with a 100 micron aperture. A 40 milligram sample of the silica is dispersed in 100 milliliters of 1 percent saline solution, ISOTON ® II (Manufactured by Coulter Diagnostics, Inc.), for 10 minutes at 1000 rpm with a 4 blade 1.75 inch propeller stirrer in order to disperse the agglomerates without breaking them up. Five milliliters of the resulting dispersion is diluted with 245 milliliters of ISOTON ® II and counted. The Coulter Counter with 100 micron aperture detects particles between about 2 and 40 microns, but does not detect particles smaller than 2 microns. Particles below 2 microns contribute little or no flatting effect, so that this test method detects only those particles which contribute to the flatting effectiveness of the tested material.

Similarly, other known types of silica flatting agents, such as pyrogenic silicas, arc silicas, aerogels, and hydrogels provide particles of a desired size distribution and median size when dispersed in coating formulations. Such particles may be in the form of aggregates, agglomerates, gel fragments, or other forms. However, the particles are physically separate and have flatting effect. For convenience, these separate, dispersed particles, will be considered as agglomerates for the purpose of expressing particle size distributions and medians. Agglomerate size is an important characteristic of flatting agents. Excessively fine agglomerates, e.g., below 2 microns, have little or no flatting effect, while excessively large agglomerates, e.g., larger than about 20 microns, may impart undesirable roughness to the dried coating film. However, when flatting agents having particles smaller than 2 microns are incorporated into coating formulations at relatively high loadings, e.g., 10 to 15 percent, the fines may agglomerate to some extent and thus contribute to the flatting effect.

Flatting agents of different size distributions and median sizes are preferred for different applications. Thus, hydrated, precipitated silicas having an agglomerate size distribution over the range of from about 2 to about 30 microns and a weight median agglomerate size of between about 8 and 12 microns, e.g., 10 microns, are often used, for example, in texturized vinyl fabric topcoats or coil coatings. Those having an agglomerate size distribution over the range of from about 2 to about 20 microns and a weight median agglomerate size of between about 6 and 8 microns, e.g., about 7 microns, are particularly useful, for example, in coil coatings, appliance finishes, and metal furniture finishes. Those having an agglomerate size distribution over the range of from about 2 to about 10 microns and a median size of between about 2 and 6 microns, e.g., about 4 microns, are particularly useful, for example, in nitrocellulose furniture lacquers and vinyl topcoat lacquers where low gloss and a very smooth finish are desired.

When it is stated herein in the specification and the claims that a flatting agent, e.g., an amorphous, precipitated silica flatting agent, has an agglomerate size distribution of from 2 to 30 microns, from 2 to 20 microns, from 2 to 15 microns, or from 2 to 10 microns, it is meant that at least 75, e.g., 75 to 95, weight percent; at least 70, e.g., 70 to 95, weight percent; at least 60, e.g., 60 to 90, weight percent; or at least 45, e.g., 45 to 75, weight percent, respectively, of the silica is in the specified range. Generally, the broader the size range, the higher is the weight percent of silica within the range. For silica of a specified size range, e.g., 2 to 10 microns, the greater weight of the silica that is not within the range will be below the range. That is, a flatting agent of a stated size range will be substantially free of particles above the size range, but may have a substantial weight proportion of particles below the size range.

Although precipitated silica flatting agents will typically have agglomerate particles having sizes over the broad ranges herein disclosed, silica flatting agents may have particles over only a part of a range, or of uniform size within a range. The desirable particle sizes and size ranges for flatting agents are well known, but are recited herein in order to characterize more fully the products made in accordance with this invention.

Although hard settling may be experienced with these flatting agents in a number of types of coating formulations, the problem is particularly acute in certain clear coating formulations such as nitrocellulose lacquers. It is stated in U.S. Pat. No. 3,607,337, at Column 1, lines 14–16, that the presence in lacquers of polar solvents, such as lower alochols, increases the tendency of untreated silica to form hard deposits upon settling. However, no reliable way has been found to predict the settling behavior of a silica flatting agent in a particular formulation. It has been observed that untreated precipitated silica flatting agent will settle hard in the typical nitrocellulose lacquer formulation shown just before Example I of this specification, but does not settle hard in the flatting efficiency nitrocellulose test lacquer formulation shown in Example I.

Divalent metal fluosilicates useful in the practice of this invention include all those known in the art, both anhydrous and hydrated, such as fluosilicates of barium, cadmium, calcium, cobalt (II), copper (II), iron (II), lead (II), magnesium, manganese (II), mercury (II), nickel (II), strontium, and zinc. Specific examples of these fluosilicates include $BaSiF_6$, $CdSiF_6 \cdot 6H_2O$, $CaSiF_6$, $CoSiF_6 \cdot 6H_2O$, $CuSiF_6 \cdot 4H_2O$, $CuSiF_6 \cdot 6H_2O$, $FeSiF_6 \cdot 6H_2O$, $PbSiF_6 \cdot 2H_2O$, $PbSiF_6 \cdot 4H_2O$, $MgSiF_6$, $MgSiF_6 \cdot 6H_2O$, $MnSiF_6 \cdot 6H_2O$, $HgSiF_6 \cdot 6H_2O$, $NiSiF_6 \cdot 6H_2O$, $SrSiF_6 \cdot 2H_2O$, and $ZnSiF_6 \cdot 6H_2O$. Notable among these for low cost and ready availability is magnesium fluosilicate, particularly the hexahydrate.

The proportion of metal fluosilicate to be used depends upon the kind, the surface area, and the particle size of the treated silica, the kind and particle size of the metal fluosilicate, the extent of blending, the length of the aging period before use, and the intended use of the treated silica. Thus, the treated silica composition may contain from about 0.1 to 10 weight percent or more, e.g., 0.5 to 5 percent, of metal fluosilicate calculated as F, fluorine, and based on the weight of silica free of adsorbed water. A flatting agent for use in nitrocellulose lacquer, for example, may desirably contain about 1.5 to 4 percent, e.g., 2 to 3 percent, F.

In one embodiment of this invention, dry, finely divided silica, such as silica having its particles in sizes useful for flatting agent, is imtimately blended with dry metal fluosilicate which is at least as finely divided. Blending may be accomplished by any method known for the blending of dry powders, such as tumbling in a drum, shaking, sifting, entraining in air, fluidizing, etc. The resulting blend is then aged to allow the silica and fluosilicate to interact.

In another embodiment, dry pellets of silica, such as precipitated silica dryer pellets, are milled and blended with metal fluosilicate to produce dry, finely divided silica having the fluosilicate intimately blended therewith. If the design of the mill, such as a fluid energy mill or a vertical mill, provides efficient blending as well as milling, the silica pellets and the fluosilicates may be fed separately into the mill at rates adjusted to give the desired fluorine content in the final composition.

The silica pellets and the fluosilicates may be premixed before being fed to the mill, so that more intimate blending is achieved in the mill. For example, silica pellets and fluosilicate powder solution, or slurry may first be mixed, for example by tumbling. When the resulting dry mixture is fed to the mill, an intimate blend of finely divided powders is produced.

For convenience in handling and measurement, the metal fluosilicate may be added to the mill or pre-mixed with the silica pellets either as dry particles or as a concentrated aqueous solution or slurry. Inasmuch as this invention rests on the surprising discovery that a soft-settling fluosilicate-treated flatting agent may be prepared simply by dry blending finely divided silica and fluosilicate and aging the blend, in contrast with the wet process disclosed in U.S. Pat. No. 2,625,492, the use of an aqueous solution or slurry of metal fluosilicate must be carefully controlled. Finely divided silica is capable of adsorbing a substantial proportion of water while remaining dry, i.e., dry to the touch. In addition, some or all of the added water may be lost during milling, particularly if a hammer mill or a fluid energy mill is used. When fluosilicate solution or slurry is added to the mill separately, or is distributed on the silica pellets as they are fed into the mill, a minor proportion of water sufficient to facilitate the handling and transfer of the fluosilicate but insufficient to wet the milled, treated silica may be used. Thus, aside from a brief wetting of the surfaces of the silica pellets, it is contemplated that the silica is kept dry, as the term is used herein, during and after blending with metal fluosilicate in accordance with the practice of this invention.

Whether the metal fluosilicate is added to the mill or premixed with the silica pellets in wet or dry form, both the silica and the metal fluosilicate are in a dry, finely divided state when they are blended intimately in the mill. Milling and blending may be going on at the same time in the mill, so that wetted pellets of silica may be present in the mill with finely, divided silica. However, the finely divided silica is dry in the mill when it becomes blended with dry metal fluosilicate, and the treated silica blend is dry as it comes from the mill. The dry blend contains between about 1 and 50 percent water, based on the weight of blend, including water adsorbed on the silica and water of hydration, if any, of the metal fluosilicate. Ordinarily, the water content is between about 3 and 25 percent, for example, 5 to 15 percent.

It is believed that the dry blend is initially an intimate physical mixture of finely divided silica and metal fluosilicate, but after a period of time, the components of the mixture interact to some extent, so that the aged mixture possesses properties not possessed by the freshly prepared mixture. The aged mixture contains particles of metal fluosilicate and particles, e.g., agglomerates, of silica which are surface coated with fluosilicate.

A precipitated silica flatting agent prepared by fluid energy milling of dry-mixed silica pellets and magnesium fluosilicate hexahydrate at first does not show improved settling when tested in nitrocellulose lacquer, but the same mixture, when tested after resting overnight at room temperature, does show improved settling. Thus, a flatting agent treated in accordance with this invention is aged for a time sufficient to render it softer settling than untreated silica in a particular coating formulation such as a nitrocellulose lacquer. The period of time necessary for the silica and the fluosilicate in the treated silica to interact may be determined by testing the settling behavior of the treated silica in nitrocellulose lacquer as hereinafter described.

Any finely divided silica treated in accordance with this invention may be so tested, even if the silica will not be used as a flatting agent, in order to determine whether interaction has taken place. Typically, at room temperature, the time is at least several hours, e.g., about 6 to 12 hours, 24 to 48 hours, or more. The maximum aging time is limited only by convenience, because once suffucient time has passed, the treated silica may be stored indefinitely before use.

Silica pellets useful in the practice of this invention are agglomerates of finely divided silica, preferably amorphous, precipitated silica, which may be reduced by mechanical or fluid energy milling to particle or agglomerate sizes useful in flatting agents. The pellets have substantially higher bulk density than the milled product, and thus smaller equipment may be used to apply and distribute the metal fluosilicate. It is easier to mix the fluosilicate with such pellets than to mix it with the light, milled powders.

The pellets may vary widely in size, for example from about 4 to 28 mesh, although larger and smaller pellets may also be used, the choice being based on the feed requirements of the particular mill being used, on the bulk density of the pellets, and on convenience in handling. The distinction between these "pellets" and the agglomerate particles of the milled flatting agent is one of size. Thus, pellets smaller than about 28 mesh may be treated in accordance with this invention, but as the pellet size decreases, the advantage of using pellets also decreases. The poured bulk density of the pellets, e.g., about 15 pounds per cubic foot, is higher than that of the milled flatting agent, usually at least about 1.25 times, typically between about 1.5 to 10 times, that of the milled product. Thus, the milled product may have a bulk density of from about 2 to about 10 pounds per cubic foot.

In general, the silica and the fluosilicate may be blended at any convenient temperature and pressure consistent with maintaining at least about 1 weight percent of adsorbed water on the silica. Temperatures between about 0° and 100° C., more typically between about 15° and 50° C., e.g., room temperature, are useful.

In the best mode of treating the silica now contemplated by the inventors, pellets of hydrated, precipitated silica and divalent metal fluosilicate, notably magnesium fluosilicate, are fed independently into a mill such as a mechanical mill or, preferably, a fluid energy mill, and are milled together therein. The pellets and the fluosilicate may be fed separately directly into the intake of the mill, e.g., into the venturi of a fluid energy mill, or they may be fed separately into a device such as a screw or conveyor that directly feeds the mill. Both forms of feeding are within the intended meaning of the phrase "fed independently into the mill". Of course, alternating intermittent feed so coordinated as to have the effect of continuous simultaneous feed, so that the silica and the fluosilicate are milled together in the mill, is also within the intended meaning. The point of this embodiment is that a separate blending step is avoided. Rather, the milling and blending are both accomplished in the mill.

Fluid energy mills and methods of operation useful in the practice of this invention are described in McCabe and Smith, Unit Operation of Chemical Engineering, 2nd. Ed., (McGraw-Hill Book Co.: New York, 1967), pages 838–839, and Perry and Chilton, Chemical Engineers' Handbook, 5th Ed., (McGraw-Hill Book Co.: New York, 1973), pages 8–43 and 8–44. Such mills are typically fed by a conveyor or screw that delivers pellets to a venturi injector at the mill. The fluosilicate may be applied at any convenient point in the feed line up to and including the venturi injector. Preferably, the fluosilicate is applied to the pellets and distributed thereon, e.g., by spraying, just before the pellets enter the injector. However, because fluid energy mills provide thorough mixing of the milled powder and consequently provide uniform distribution of the fluosilicate on the powder, uniform distribution of the fluosilicate on the feed pellets is not critical. One advantage of the use of a fluid energy mill is that at least a part of the water added as fluosilicate solution or slurry is removed in the mill, giving a drier product. Fluid energy mills are powered typically with compressed air or superheated steam. The steam may enter the mill at temperatures of 500° F. or higher, but cools rapidly, so that the powered product may come out at about 100°–200° F.

The fluosilicate-treated silica flatting agents of this invention may be used in any of the known coating formulations in which silica flatting agents are used, principally lacquers and varnishes such as nitrocellulose lacquers, vinyl lacquers, alkyd varnishes, and alkyd-urea varnishes, and alkyd-melamine varnishes. The treated silicas have a flatting efficiency very nearly as great as the corresponding untreated silicas, and in addition, are expected to be soft-settling in any formulation in which the treated silica of U.S. Pat. No. 2,625,492 is soft-settling, notably certain nitrocellulose lacquers.

In order to determine whether a flatting agent settles "hard," in a particular coating formulation, as the term is used in the application and the claims, the following procedure, hereinafter called "the test tube inversion test," may be used. The flatting agent is dispersed in the coating formulation at a concentration of 5.2 percent by weight of dry solids in the formulation by stirring. A 10 milliliter portion of the resulting formulation is placed in a stoppered, 15 by 150 millimeter test tube, which is allowed to rest vertically for 24 hours. The extent of settling is observed by tipping the bottom of the tube from 45° below the horizontal to 45° above, thereby partially inverting the tube, and the presence or absence of a deposit of settled flatting agent on the bottom is noted. The tube is then inverted repeatedly and the number of inversions required to redisperse the deposit is recorded. A flatting agent settles "hard" if 50 or more inversions are required to redisperse the deposit. It settles "soft" if fewer than 10 inversions redisperse the deposit. It is "non-settling" if no deposit is present after one or two inversions. By "non-settling" it is meant that the bulk of the flatting agent is uniformly resuspended or redispersed by very gentle agitation so that no more than a slight film of very fine particle silica, if any, remains at the bottom. Even a flatting agent that is "non-settling" by this standard may settle very softly to form a loose floc topped by a band of clear liquid, but the floc is so loose that one or two inversions redisperse it. It has been found that this test correlates well with a common industry test for settling, which is two-month storage of coating formulation in cans.

This invention is concerned with an improved silica flatting agent useful in known lacquer and varnish formulations, including the lacquers and varnishes described in the voluminous technical literature of the coating industry, particularly D. Parker, Principles of Surface Coating Technology, (John Wiley & Sons: New York, 1965); the Federation Series on Coatings Technology, Units 1 through 23, (F.S.C.T., 1315 Walnut Street, Philadelphia, PA 19107), and U.S. Pat. No. 3,607,337, which discloses specific urea-formaldehyde, nitrocellulose, polyamide resin, polyester resin, and alkyd resin lacquers and an alkyd enamel. Further specific nitrocellulose lacquer formulations appear below. One typical nitrocellulose lacquer formula is:

| TYPICAL NITROCELLULOSE LACQUER | |
|---|---|
| Materials | Gallons |
| Cotton Cut[1] | 21.00 |
| Short Oil Coconut Alkyd | 6.00 |
| Expoxidized Soybean Oil | 2.25 |
| Dioctyl Phthalate | 0.75 |
| Isopropyl Acetate | 24.00 |
| Isobutanol | 12.00 |
| VMP Naphtha | 15.00 |
| Butyl Acetate | 4.00 |
| Xylol | 6.50 |
| Toluol | 4.50 |

[1]Cotton Cut:
½sec RS nitrocellulose   17.0 volume percent
xylol                    39.0
isopropanol              22.5
esters                   21.5

The following examples are intended to illustrate the practice of this invention, but the invention is not limited to the illustrated embodiments.

EXAMPLE I

Precipitated silica having an ultimate particle size of about 0.021 microns was prepared by the gradual acidification of an aqueous solution of sodium silicate with carbon dioxide. The silica was washed and allowed to settle into a slurry several times. Finally, slurry having its pH adjusted to 6.2 was filtered, the filter cake was dried in a rotary dryer, and the product was screened to obtain a pellet fraction which is sold by PPG INDUSTRIES, INC., under the designation of Hi-Sil® 210. On an as-shipped basis, Hi-Sil® 210 has an adsorbed water content of about 5 weight percent.

One thousand gram portions of silica pellets were blended with 72.3 grams of dry $MgSiF_6 \cdot 6H_2O$ for ½ hour in a Hobart mixer without added water. The resulting blends contained 3 percent $F^-$ by weight of silica pellets.

Portions of the blends were milled in a 4 inch, compressed air powered, fluid energy mill to a median agglomerate size of about 4 microns and were aged before milling and after milling for varying periods before being tested for settling. Milled product contained about 2.6 percent F, some fluosilicate being lost as fines. Table I reports the results of these tests.

In this and the following example, the silica samples were tested for settling in Lilly nitrocellulose lacquer 1402 at a loading of 5.2 percent by weight of resin solids. The samples were incorporated by the following procedure.

First, a grind vehicle was prepared by mixing 1060 grams of Lilly lacquer 1402 and 940 grams of the following solvent mixture:

5900 grams Isopropyl Acetate
 2750 grams Isobutanol
 3150 grams VMP Naptha
 1000 grams N-Butyl Acetate
 1600 grams Xyol
 750 grams Toluol Sixty grams of grind vehicle was stirred in a ½ pint paint can with a 1½ inch high shear blade at a speed sufficient to produce a small vortex, and flatting agent was added until the dispersion became pasty and did not move at the edge. The weight of silica flatting agent added was noted. The paste was then dispersed on a small sand mill without sand, using a 1½ inch high shear, high dispersion blade at 5000 revolutions per minute for 5 minutes, with occasional tapping of the can edge. This high dispersion technique is intended to accentuate settling tendencies, but may result in overdispersion and lower flatting efficiency than the more gentle dispersion appropriate for precipitated silica flatting agents. Sufficient paste, which contains about 10 weight percent resin solids and 25 weight percent flatting agent solids, was stirred into more Lilly lacquer 1402 and sufficient solvent mixture to produce a final lacquer containing 19 percent by weight resin solids and 5.2 percent flatting agent based on resin solids.

In all tests using Lilly lacquer 1402, current production samples obtained from Lilly Industrial Coatings, Inc., 666 South California Street, Indianapolis, IN 46225, were used. Lacquers of this type are widely used in furniture finishing.

The lacquer samples containing the silica were tested for settling both by the test tube inversion test after 2 days of standing and by storage in ½ pint cans. The cans were stored for 2 weeks upside down, then inverted gently 10 times and opened, and any deposits remaining on the can lids were probed with a spatula to determine their hardness.

In Table I, the figures under "Two-day Settling" refer to test tube inversions needed to resuspend the silica. The "Two-week Settling" results refer to the hardness of the deposits on the can lids.

TABLE I $MgSiF_6 \cdot 6H_2O$ — Hi-Sil®210 Dry Blend
Lilly Lacquer Settling

| Silica Sample No. | Aging, hour Before Milling | Aging, hour After Milling | Two-day Settling Inversions Needed to Resuspend | Two-Week Settling |
|---|---|---|---|---|
| 1 | 72 | none | >50 | moderately soft |
| 2 | 48 | none | 45 | hard |
| 3 | none | none | 47 | moderately hard |
| 4 | 4 | 16 | 6 | very soft |
| 5 | none | 24 | 3 | very soft |
| 6 | 24 | 24 | 19 | very soft |
| 7 | 72 | 24 | 2 | none |
| 8 | none | 48 | 1 | none |
| 9 | 24 | 48 | — | very soft |
| 10 | 72 | 48 | 1 | none |
| 11 | control (no $F^-$) | none | >50 | hard |

The data in Table I show that treatment of silica in accordance with this invention can produce a soft-settling flatting agent, and that aging of the treated silica is necessary. Further, it can be seen that aging of the blend before milling helps to some extent.

Portions of silica samples 1, 3, 4, and 11 of Table I were tested for flatting efficiency in the following nitrocellulose lacquer formulation at a loading of 5.2 percent by weight of resin solids. Neither the control nor the treated silica settles hard in this lacquer.

FLATTING EFFICIENCY NITROCELLULOSE TEST LACQUER

| Material | Gallons per 100 Gallons |
|---|---|
| Toluene | 18.67 |
| ½ sec. RS Nitrocellulose[1] | 8.09 |
| Stir 10 minutes and add | |
| Ethanol, 95% | 3.67 |
| Methyl Isobutyl Ketone | 10.48 |
| Butyl Acetate | 11.68 |
| Mix until uniform solution and add | |
| Duraplex ND-77B[2] | 14.37 |
| Dioctyl Phthalate | 1.83 |
| Lacquer Thinner[3] | 31.16 |

[1]Hercules Inc.
[2]Rohm & Haas coconut alkyd
[3]Lacquer Thinner

| | |
|---|---|
| Ethanol, 95% | 15.00 parts by volume |
| Methyl Isobutyl Ketone | 20.00 |
| Butyl Acetate | 25.00 |
| Toluene | 40.00 |

The control and treated silicas were dispersed into lacquer samples by direct stir-in using 1½ inch high shear blades. Samples then evaluated by the Hegman test (a rough measure of the degree of dispersion, with high numbers indicating greater dispersion); the 60° gloss as measured with a Hunter D16 Glossmeter (Hunter Assoc. Lab., Fairfax, VA 22030); and the 85° sheen as measured with the Gardner Glossmeter (Gardner Lab., Bethesda, MD). The results are summarized in Table II.

TABLE II

| Sample No. | Hegman | 60° | 85° |
|---|---|---|---|
| 1 | 4 | 10 | 14 |
| 3 | 4 | 13 | 14 |
| 4 | 3 | 14 | 13 |
| 11 (control) | 4½ | 12 | 17 |

The data in Table II show that the treated silica is an effective flatting agent.

EXAMPLE II

Unscreened pellets of silica precipitated and dried as in Example I and having about 5 percent adsorbed water were fed at the rate of 380 pounds per hour to a plant-sized fluid energy mill (Fluid Energy's 0405-C mill) powered with superheated steam at 95 pounds per square inch gauge (p.s.i.g.). Simultaneously, an aqueous solution of magnesium fluosilicate having 200 grams of fluorine per liter was pumped into the mill inlet throat at the rate of 432 milliliters per minute, providing 3 percent F by weight of silica pellets. Milled product had a median agglomerate size of about 4 microns and contained about 2.1 to 2.4 percent F and about 5 percent adsorbed water. Most of the water added as fluosilicate solution was evaporated in the mill.

Samples of treated silica were taken at 15 minute intervals during the run and after aging overnight were incorporated into Lilly lacquer 1402 as described above for the 2 day test tube inversion settling test and the 2 week ½ pint can settling test. Table III reports the settling test results and the fluorine content of the samples.

TABLE III

| | Wet Addition At The Mill | | |
|---|---|---|---|
| Sample, Time Taken | Two-Day Settling Inversions Needed to Resuspend | Two-Week Settling | F, %[2] |
| 1115 | 1 | none | — |
| 1130 | 1 | none | 2.1 |
| 1145 | 1 | none | 2.0[3] |
| 1200 | 1 | none | 2.3 |
| 1215 | 1 | very soft | — |
| 1230[1] | >50 | moderately hard | 0.2 |
| 1245 | 1 | slight trace | 2.3 |
| 1300 | 1 | none | — |
| control | >50 | moderately hard | — |
| control | >50 | moderately hard | 0.1 |

[1] Fluosilicate line had plugged and was cleared at 1237.
[2] F, % determined in all cases except sample 1145 by X-ray analysis for magnesium, taking the difference between the magnesium content of the control and of the treated samples as attributable to $MgSiF_6$.
[3] F determined directly This demonstrates the efficacy of addition of fluosilicate directly to the mill. Although fluosilicate solution was used for convenience, equally desirable results can be obtained by adding the fluosilicate in dry form at the mill throat with the use of a suitable device, such as a screw feeder, to control the rate of addition.

EXAMPLE III

Samples of silica treated with calcium fluosilicate and with zinc fluosilicate in accordance with this invention were as soft-settling as samples treated with magnesium fluosilicate when tested as described above, although somewhat longer aging was required to develop the soft-settling property. Thus, it is believed that the other divalent metal fluosilicates disclosed above can also be used to prepare soft-settling flatting agents in accordance with this invention.

Although this invention has been described with reference to particular details and embodiments, the particulars are not intended to limit the invention, the scope of which is defined by the following claims.

We claim:

1. A method of preparing metal fluosilicate treated silica flatting agent which comprises:
   independently feeding pellets of amorphous, precipitated silica and divalent metal fluosilicate to a mill and blending the silica and the fluosilicate therein while in a dry, finely divided state;
   recovering from the mill dry, treated silica having a fluosilicate content, calculated as F, of between about 0.1 and 10 percent by weight of silica and having its particles in sizes useful for flatting agent; and
   aging said dry, fluosilicate-treated silica for a time sufficient to render the treated silica more soft settling than untreated silica in a coating formulation, said silica containing during such aging at least 1 weight percent adsorbed water.

2. The method of claim 1, wherein the metal fluosilicate is fed dry.

3. The method of claim 1, wherein the metal fluosilicate is wet.

4. The method of claim 1, wherein the mill is a fluid energy mill.

5. The method of claim 1, wherein the metal fluosilicate is magnesium fluosilicate.

6. The method of claim 1, wherein the metal fluosilicate is calcium fluosilicate.

7. The method of claim 1, wherein the metal fluosilicate is zinc fluosilicate.

8. The method of claim 1, wherein the dry, treated silica has between about 3 and 25 percent adsorbed water during aging.

9. The method of claim 1, wherein the dry, treated silica is aged for at least about 12 hours.

10. A method of preparing metal fluosilicate-treated silica which comprises:
    intimately blending, while in a dry, finely divided state, silica and a divalent metal fluosilicate to produce dry, fluosilicate-treated silica having a fluosilicate content calculated as fluorine (F) of between about 0.1 and 10 percent by weight of silica, and
    aging said dry fluosilicate-treated silica for a time sufficient for the silica and the metal fluosilicate to interact.

11. The method as recited in claim 10, wherein the step of intimately blending comprises the step of milling together said dry, finely divided silica and divalent metal fluosilicate.

12. The method as recited in claim 10, wherein said divalent metal fluosilicate is wetted with water, and said water being in an amount sufficient so that the silica remains dry during blending.

13. The method as recited in claim 10, wherein said divalent metal fluosilicate is in a substantially dry state.

14. The method as recited in claim 11, wherein said divalent metal fluosilicate is in a substantially dry state.

15. The method as recited in claim 14, wherein the step of milling is performed in a fluid energy mill.

16. The method as recited in claim 15, wherein the silica is an amorphous, precipitated silica.

17. The method as recited in claim 16, wherein the metal fluosilicate is magnesium fluosilicate.

18. The method as recited in claim 16, wherein the metal fluosilicate is calcium fluosilicate.

19. The method as recited in claim 16, wherein the metal fluosilicate is zinc fluosilicate.

20. The method as recited in claim 10, wherein the metal fluosilicate is magnesium fluosilicate 21. The method as recited in claim 10, wherein the metal fluosilicate is calcium fluosilicate.

22. The method as recited in claim 10, wherein the metal fluosilicate is zinc fluosilicate.

23. The method as recited in claim 17, wherein the silica has from about 1 to 25 percent adsorbed water.

24. The method as recited in claim 18, wherein the silica has from about 1 to 25 percent adsorbed water.

25. The method as recited in claim 19, wherein the silica has from about 1 to 25 percent adsorbed water.

26. The method as recited in claim 12, wherein silica is an amorphous, precipitated silica.

27. The method as recited in claim 26, wherein the divalent metal fluosilicate is magnesium fluosilicate.

28. The method as recited in claim 26, wherein the divalent metal fluosilicate is calcium fluosilicate.

29. The method as recited in claim 16, wherein the divalent metal fluosilicate is zinc fluosilicate.

30. The method as recited in claim 13, wherein the silica is an amorphous, precipitated silica.

31. The method as recited in claim 30, wherein the divalent metal fluosilicate is magnesium fluosilicate.

32. The method as recited in claim 30, wherein the divalent metal fluosilicate is calcium fluosilicate.

33. The method as recited in claim 30, wherein the divalent metal fluosilicate is zinc fluosilicate.

34. The method as recited in claim 31, wherein the silica has from about 1 to 25 percent adsorbed water.

35. The method as recited in claim 32, wherein the silica has from about 1 to 25 percent adsorbed water.

36. The method as recited in claim 33, wherein the silica has from about 1 to 25 percent adsorbed water.

37. An improved granular composition comprised of particles of amorphous, hydrated-precipitated silica flatting agents, said particles having an ultimate particle size of between about 0.01 and 0.05 microns, and agglomerates with a weight median agglomerate size of from about 2 to 12 microns, and a distribution size range of from 2 to 40 microns, a B.E.T. surface area of from 100 to 300 square meters per gram, in which the improvement comprises said particles having deposited on their surface from about 0.1 to 10 weight percent per weight of silica free of adsorbed water based on weight of fluorine, of a metal fluosilicate selected from the group consisting of calcium fluosilicate and zinc fluosilicate or mixtures thereof.

* * * * *